United States Patent
Shibasaki

(10) Patent No.: US 9,384,430 B2
(45) Date of Patent: Jul. 5, 2016

(54) IMAGE PROCESSING APPARATUS, IMAGE PROCESSING METHOD, AND STORAGE MEDIUM

(71) Applicant: CANON KABUSHIKI KAISHA, Tokyo (JP)

(72) Inventor: Akira Shibasaki, Soka (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/857,643

(22) Filed: Sep. 17, 2015

(65) Prior Publication Data

US 2016/0086067 A1    Mar. 24, 2016

(30) Foreign Application Priority Data

Sep. 22, 2014    (JP) .................................. 2014-192889

(51) Int. Cl.
  *H04N 1/60* (2006.01)
  *G06K 15/02* (2006.01)
  *G06K 15/14* (2006.01)
  *G06K 1/00* (2006.01)

(52) U.S. Cl.
  CPC ............ *G06K 15/1878* (2013.01); *G06K 15/14* (2013.01)

(58) Field of Classification Search
  CPC .......................... G06K 15/1878; G06K 15/14
  See application file for complete search history.

(56) References Cited

U.S. PATENT DOCUMENTS

| 8,363,270 B2 * | 1/2013 | Hanamoto ............. G06T 15/50 345/48 |
| 2011/0141502 A1 * | 6/2011 | Narumi .................... B41J 2/205 358/1.9 |

FOREIGN PATENT DOCUMENTS

| JP | 03-041075 B2 | 6/1991 |
| JP | 2006-177797 A | 7/2006 |

* cited by examiner

*Primary Examiner* — Quang N Vo
(74) *Attorney, Agent, or Firm* — Canon U.S.A., Inc., IP Division

(57) ABSTRACT

There is provided an image processing apparatus capable of favorably reproducing a metallic texture on a recording medium. The image processing apparatus includes an input unit configured to receive color information included in image data, a conversion unit configured to convert the color information into color material amount data of a chromatic color material, and a determination unit configured to make a determination on color material amount data of an achromatic color material to be formed on top of the chromatic color material on a recording medium so as to cause a hue of diffused light and a hue of specular reflection light of an image, which is formed of a chromatic color material corresponding to the converted color material amount data of the chromatic color material, formed on the recording medium to coincide with each other.

12 Claims, 16 Drawing Sheets

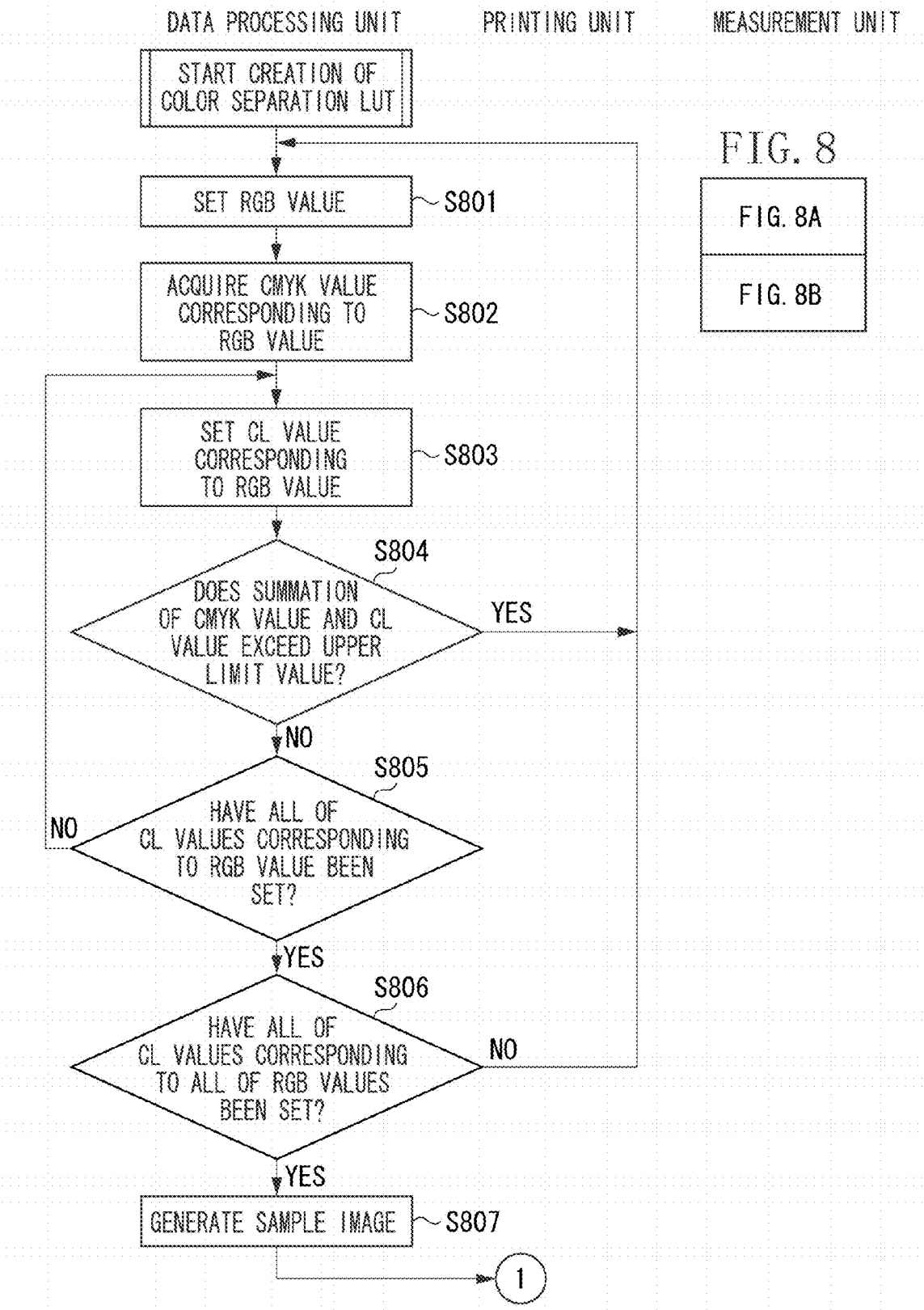

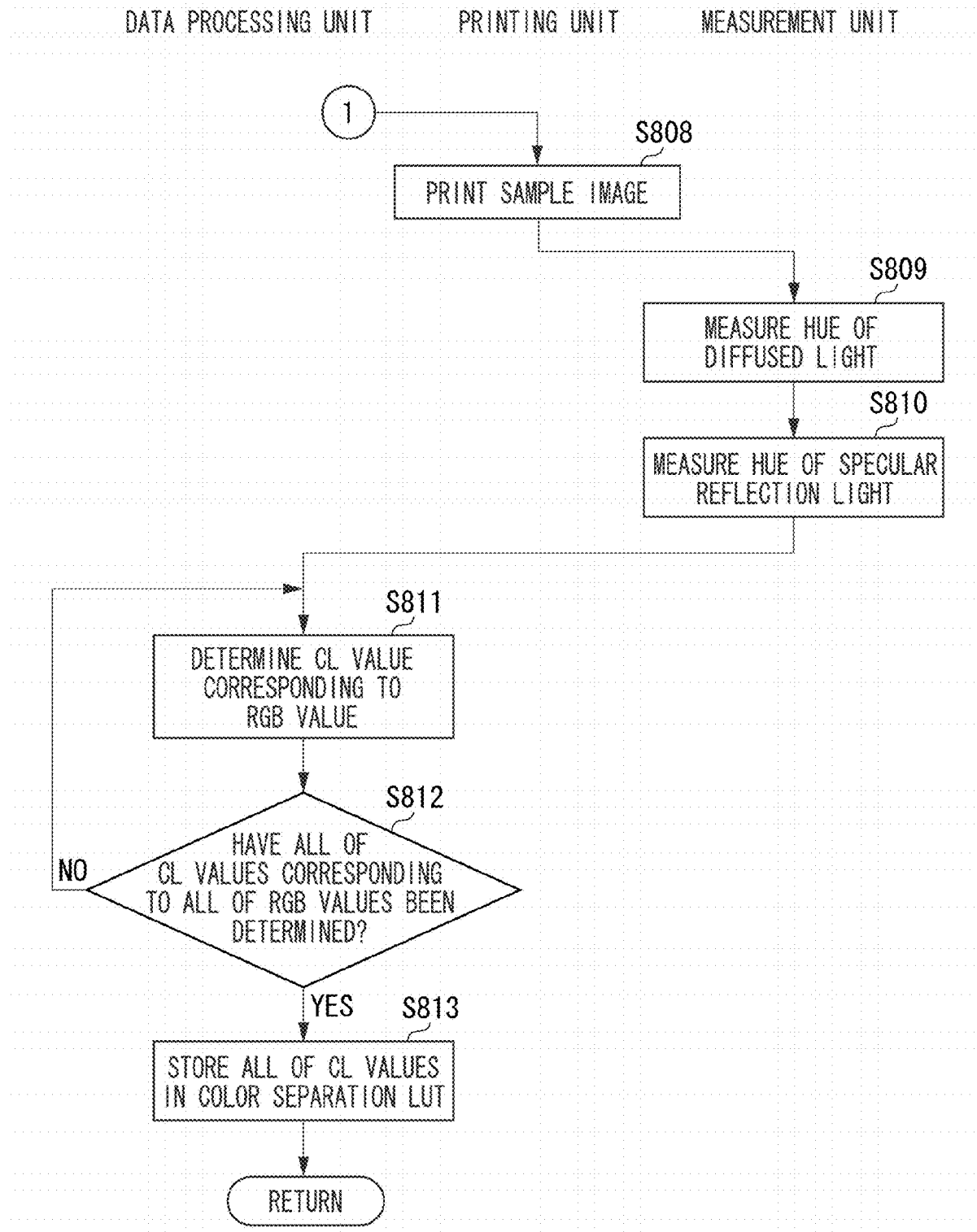

FIG. 9A

| RGB VALUE (8bit) | | | | CMYK VALUE (8bit) | | | |
|---|---|---|---|---|---|---|---|
| R | G | B | | C | M | Y | K |
| 0 | 0 | 0 | | 0 | 0 | 0 | 0 |
| 0 | 0 | 16 | | 16 | 16 | 0 | 0 |
| 0 | 0 | 32 | | 32 | 32 | 0 | 0 |
| ... | ... | ... | | ... | ... | ... | ... |
| 255 | 255 | 224 | | 192 | 192 | 255 | 255 |
| 255 | 255 | 240 | | 224 | 224 | 255 | 255 |
| 255 | 255 | 255 | | 225 | 255 | 255 | 255 |

FIG. 9B

| RGB VALUE (8bit) | | | CMYK VALUE (8bit) | | | | GL VALUE (8bit) |
|---|---|---|---|---|---|---|---|
| R | G | B | C | M | Y | K | GL |
| 0 | 0 | 0 | 0 | 0 | 0 | 0 | 0 |
| 0 | 0 | 16 | 16 | 16 | 0 | 0 | 16 |
| 0 | 0 | 32 | 32 | 32 | 0 | 0 | 32 |
| ... | | | ... | | | | ... |
| 255 | 255 | 224 | 192 | 192 | 255 | 255 | 128 |
| 255 | 255 | 240 | 224 | 224 | 255 | 255 | 48 |
| 255 | 255 | 255 | 225 | 255 | 255 | 255 | 0 |

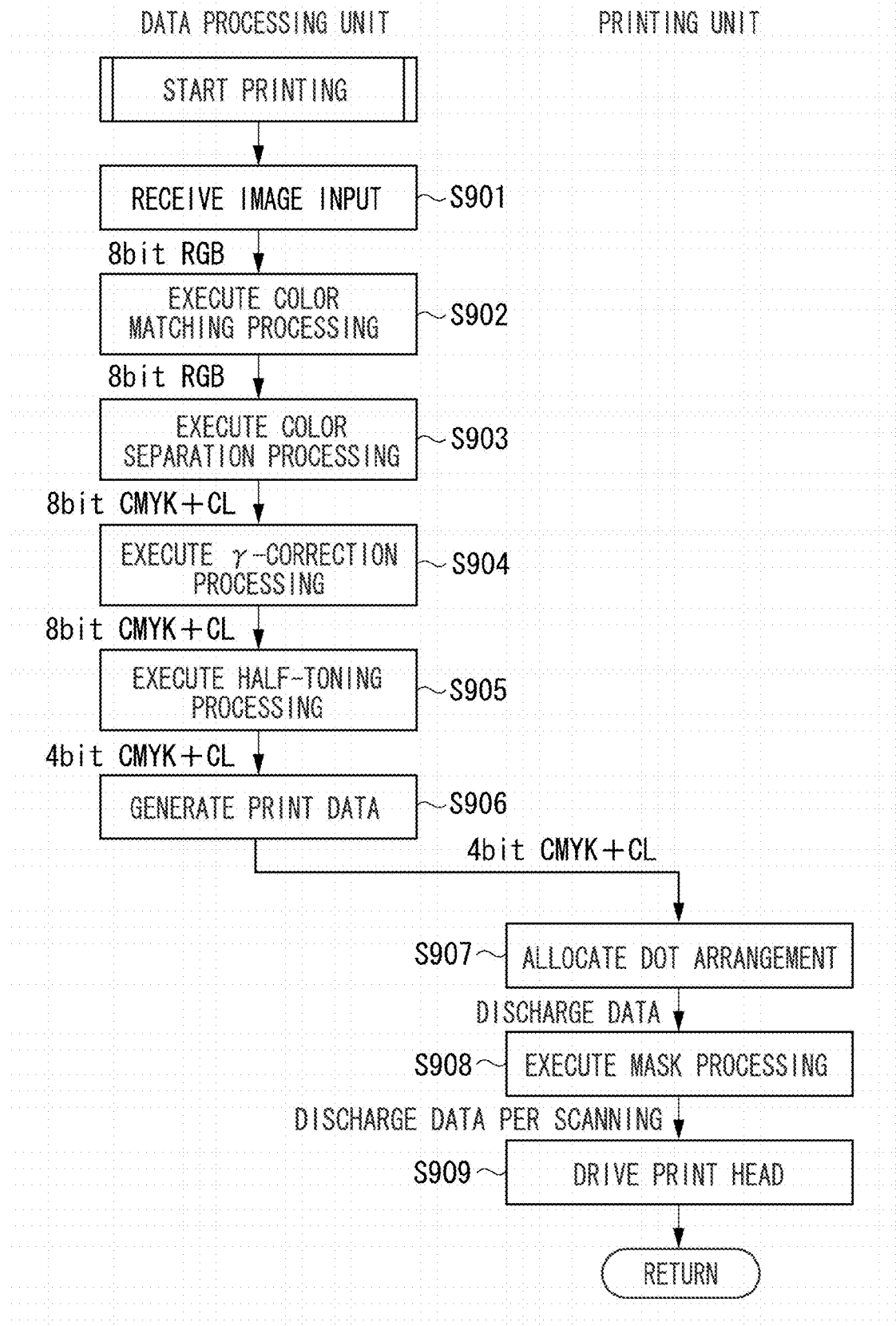

IMAGE PROCESSING APPARATUS, IMAGE PROCESSING METHOD, AND STORAGE MEDIUM

BACKGROUND OF THE INVENTION

1. Field of the Invention

The present invention relates to an image processing apparatus, an image processing method, and a storage medium. More specifically, the present invention relates to the image processing apparatus and the image processing method capable of preferably reproducing a metallic texture on a recording medium, and the storage medium storing a program for causing a computer to execute the image processing method.

2. Description of the Related Art

A printing apparatus for printing color characters and color images on a recording medium such as a recording sheet and a film includes an ink jet printing apparatus and an electro-photographic printing apparatus. For example, the ink jet printing apparatus can form an image on a recording medium by applying a color ink as a chromatic color material. Further, the electro-photographic printing apparatus can form an image on a recording medium by using a color toner as a chromatic color material.

In recent years, images formed on a recording medium through a printing apparatus have been diversified. Such images include, for example, an image having a metallic texture of gold or silver and an image expressed by a metallic color. With the increased diversification of images, there has been an increased demand for a printing method or a printing apparatus capable of reproducing a metallic texture and a metallic color on a recording medium.

A method in which printing processing is executed by using a gold toner and a silver toner, discussed in Japanese Patent Publication No. 03-041075, has been known as a method for reproducing a metallic texture on a recording medium.

However, according to the method described in Japanese Patent Publication No. 03-041075, a gold toner or a silver toner, which is relatively hard to be handled, must be used in order to reproduce a metallic texture on a recording medium, and thus the metallic texture and the metallic color cannot be easily reproduced on a recording medium.

SUMMARY OF THE INVENTION

Therefore, the present invention is directed to an image processing apparatus and an image processing method capable of favorably reproducing a metallic texture on a recording medium through a simple method without using a gold toner and a silver toner which are relatively hard to handle.

According to an aspect of the present invention, an image processing apparatus includes an input unit configured to receive color information included in image data, a conversion unit configured to convert the color information into color material amount data of a chromatic color material, and a determination unit configured to make a determination on color material amount data of an achromatic color material to be formed on top of the chromatic color material on a recording medium so as to cause a hue of diffused light and a hue of specular reflection light of an image, which is formed of a chromatic color material corresponding to the converted color material amount data of the chromatic color material, formed on the recording medium to coincide with each other.

Further features of the present invention will become apparent from the following description of exemplary embodiments (with reference to the attached drawings).

BRIEF DESCRIPTION OF THE DRAWINGS

FIG. 8 (consisting of FIGS. 8A and 8B) is a flowchart illustrating processing content of the image processing apparatus according to the first exemplary embodiment.

FIG. 9A illustrates a color ink table, and FIG. 9B illustrates a color separation look-up table (LUT).

FIG. 10 is a flowchart illustrating processing of the image processing apparatus according to the first exemplary embodiment.

DESCRIPTION OF THE EMBODIMENTS

<Definition of Terms>

Figure 1:
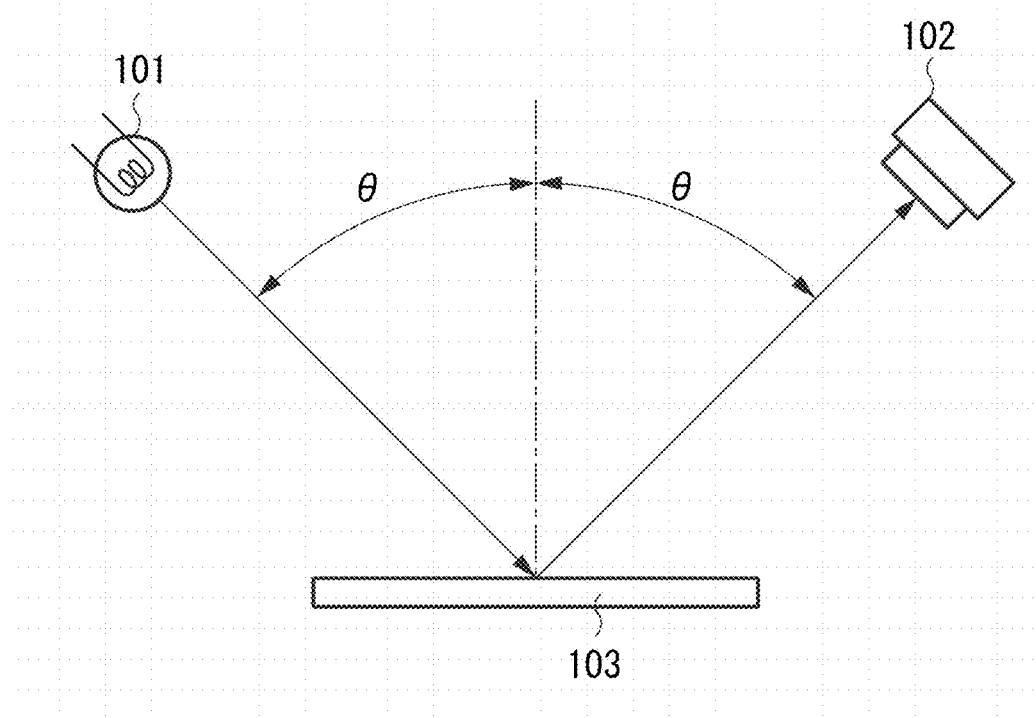
FIG. 1 is a schematic diagram illustrating a system for evaluating coloring of specular reflected light described in Japanese Patent Application Laid-Open No. 2006-177797.

In the present specification, color materials referred to as "cyan", "magenta", "yellow", "black", and "clear" are also expressed by "C", "M", "Y", "K", and "CL". Herein, the capital letter "C" that represents a cyan-color material itself also represents the color, and the data or the hue that identifies the color. The same can be also applied to the capital letters "M (magenta)", "Y (yellow)", "K (black)", "R (red)", and "CL (clear)".

Further, in the present specification, "pixel" represents a minimum unit capable of expressing tone, as well as a minimum unit regarded as a target of multi-valued image data processing (i.e., color-matching processing, color separation processing, γ-correction processing, and half-toning processing, which are described below) with respect to multibit image data. In the half-toning processing described below, one pixel is divided into four-by-four (4×4) areas, and each cell acquired by dividing the pixel is defined as "area", but this is not limited to a specific exemplary embodiment. This "area" is regarded as a minimum unit in which "ON" or "OFF" of dot discharging processing executed by a print head is to be defined.

A first exemplary embodiment of the present invention will be described below with reference to attached drawings. Constituent elements described in the present exemplary embodiment are merely examples, and not intended to limit the scope of the invention.

<Basic Principle>

A basic principle according to the first exemplary embodiment will be described below.

A printing apparatus for executing color printing on a recording medium includes an ink jet color printer and an electro-photographic color printer. The ink jet color printer uses ink containing a pigment as a color material. The electro-photographic color printer uses toner containing a pigment as a color material. For example, the ink jet color printer deposits a solid component of the color material on a recording medium to form an image.

When an image is formed on a recording medium through the above-described printing apparatus, there arises a phenomenon in which specular reflected light from the formed image is colored. For example, when the image formed on the recording medium is placed under a light source such as a spotlight, specular reflected light from the image formed on the recording medium is colored although the light from the light source (i.e., spotlight) has an achromatic color. In particular, the specular reflected light from a region where a substantial amount of cyan color material is used tends to be colored in magenta, whereas the specular reflected light from a monochrome image region tends to be colored in yellow. Further, it is known that specular reflected light from an image region is colored in iridescent in accordance with changes in the ink amount. Furthermore, a so-called "bronzing phenomenon" is also known as a phenomenon in which the specular reflected light is colored. It is known that the bronzing phenomenon arises because a complex refractive index, i.e., an optical physical quantity of the color material, depends on the wavelength.

FIG. 1 is a schematic diagram illustrating a system for evaluating coloring of specular reflected light described in Japanese Patent Application Laid-Open No. 2006-177797. A light source 101 irradiates a measurement sample 103 with light at a predetermined angle θ as an incident angle, and a light receiving unit 102 detects specular reflected light from the measurement sample 103. The light receiving unit 102 can detect a tristimulus value XxYxZx based on the CIE-XYZ colorimetric system adopted by the International Commission on Illumination (CIE). A tristimulus value XxYxZx serving as a reference (e.g., a tristimulus value XsYsZs of a black-polished glass plate having a refractive index with low wavelength dispersion) is stored, so that coloring of specular reflected light can be evaluated by comparing the detected tristimulus value with the reference tristimulus value.

Figure 2:
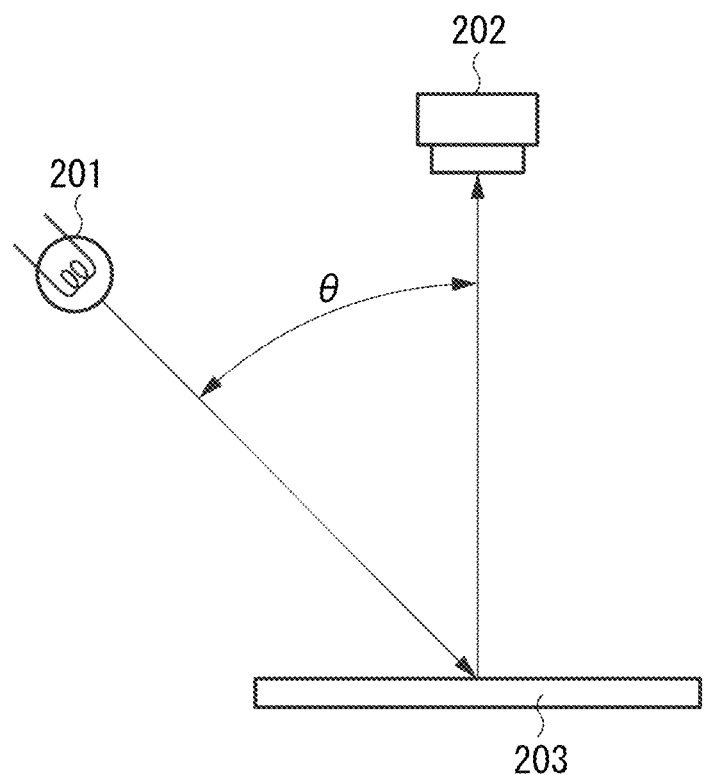
FIG. 2 is a schematic diagram illustrating a system for evaluating coloring of diffused light.

FIG. 2 is a schematic diagram illustrating a system for evaluating coloring of diffused light. A light source 201 irradiates a measurement sample 203 with light at a predetermined angle θ as an incident angle, and a light receiving unit 202 detects diffused light from the measurement sample 203. The light receiving unit 202 can detect a tristimulus value XxYxZx based on the CIE-XYZ colorimetric system. A tristimulus value XxYxZx serving as a reference (e.g., a tristimulus value XsYsZs of a perfect reflecting diffuser) is stored, so that coloring of diffused light can be evaluated by comparing the detected tristimulus value with the reference tristimulus value.

Figure 3:
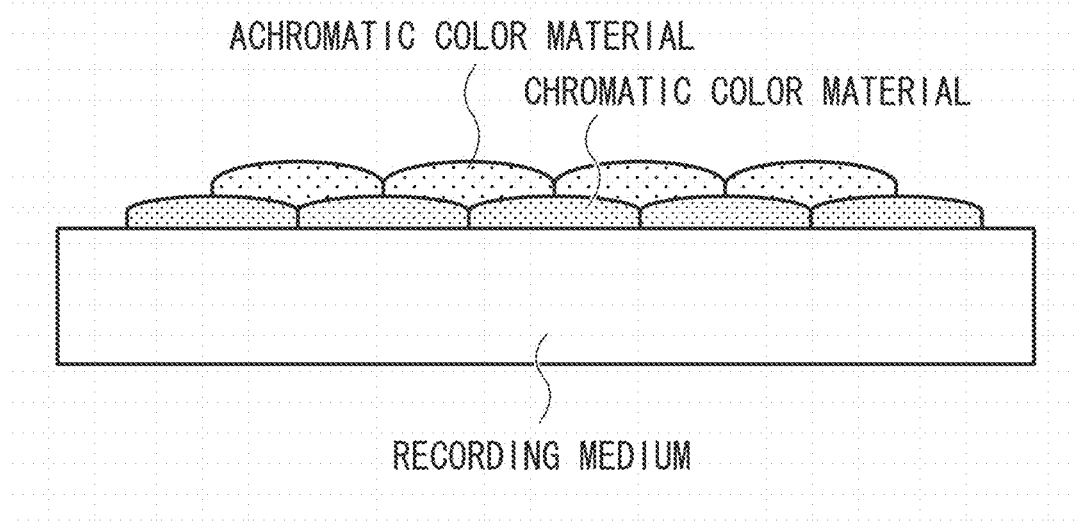
FIG. 3 is a schematic cross-sectional view illustrating a state where an achromatic color material is applied on top of a background formed of a chromatic color material applied on a recording medium.

FIG. 3 is a schematic cross-sectional view illustrating a state where a predetermined amount of an achromatic color material is applied on top of a background formed of a chromatic color material applied on a recording medium. As illustrated in FIG. 3, when the achromatic color material is applied on top of the chromatic color material, a hue of specular reflected light is remarkably changed although a hue of diffused light is hardly changed. Further, the hue of specular reflected light varies in accordance with color of the chromatic color material applied as a background. For example, a hue of specular reflected light is different between a case where a predetermined amount of achromatic color material is applied on top of a background formed of a cyan color material and a case where the same amount of achromatic color material is applied on top of a background formed of a magenta color material.

Figure 4:
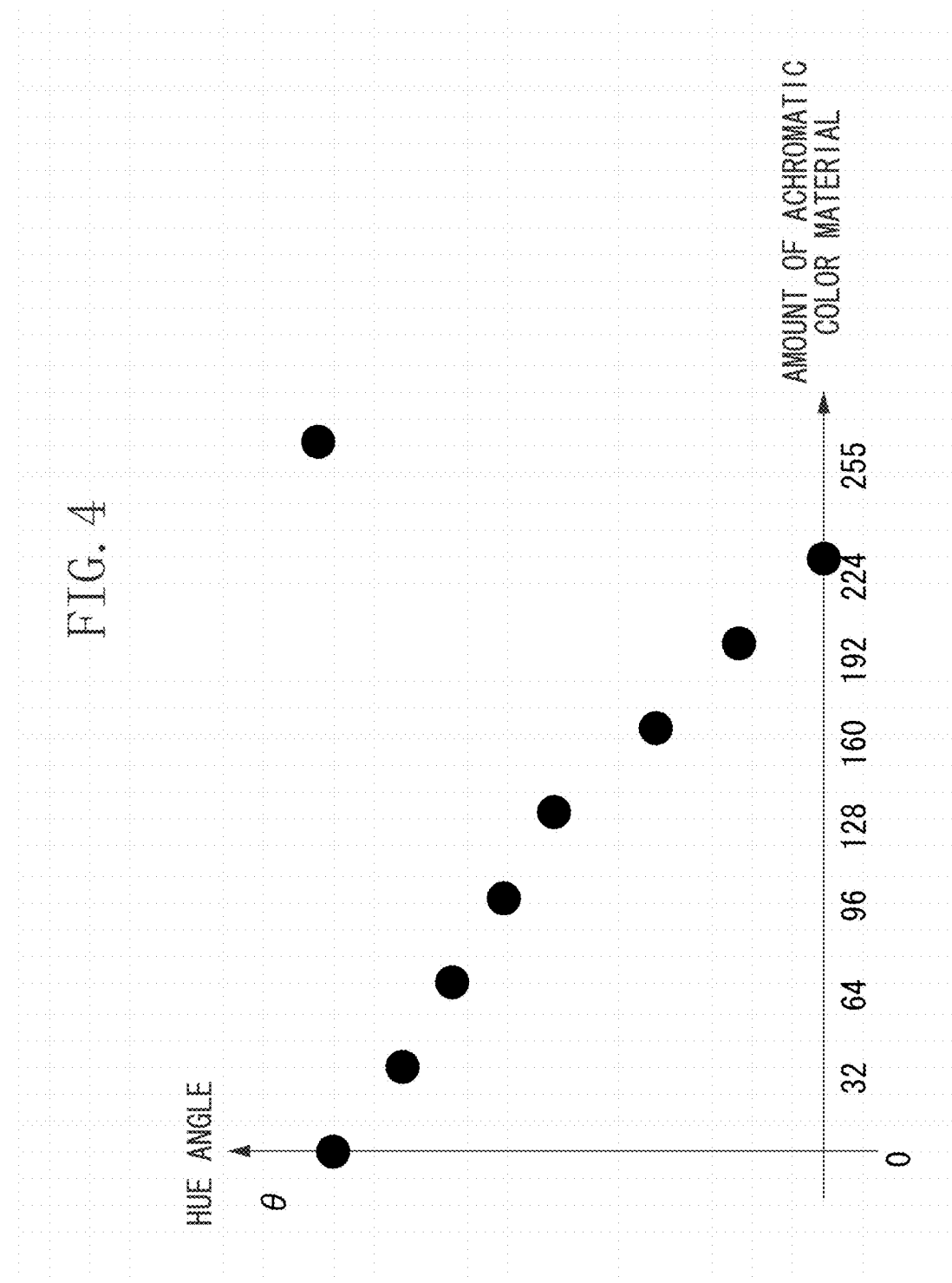
FIG. 4 is a graph illustrating an example of plot in which a hue angle is plotted in association with a discharge amount of an achromatic color material.

FIG. 4 is a plot in which a hue angle calculated by the following formula is plotted in association with a discharge amount of the achromatic color material.

$$\theta = \tan^{-1}\frac{b^*}{a^*} \qquad <\text{Formula 1}>$$

In the plot of FIG. 4, respective hues of specular reflected light, acquired by applying a different amount of achromatic color material on top of a background formed of the cyan color material, are measured based on the evaluation method described in Japanese Patent Application Laid-Open No. 2006-177797. Then, respective hue angles are acquired from the measured hues through the above formula.

As illustrated in FIG. 4, the hue of specular reflected light from a background formed of a cyan color material approximates the hue of specular reflected light from the background formed of a magenta color material when the amount of the achromatic color material is "0". Then, the hue angle gradually becomes smaller when the amount of the achromatic color material is increased. However, when the amount of the achromatic color material exceeds a predetermined amount, such as a case where the amount of achromatic color material is 255, there arises a phenomenon in which the hue of specular reflected light from the background formed of the cyan color material approximates that from the background formed of the magenta color material again.

In other words, the hue of specular reflected light from the chromatic color material can be controlled by applying the achromatic color material on top of the chromatic color material applied on the recording medium while adjusting the amount thereof. The present invention is directed to a method for causing a hue of diffused light and a hue of specular reflected light from an image output on a recording medium coincide with each other by using the above-described basic principle to form an image in which a metallic texture such as gold or silver is reproduced preferably.

<Overview of Image Processing Apparatus>

Figure 5:
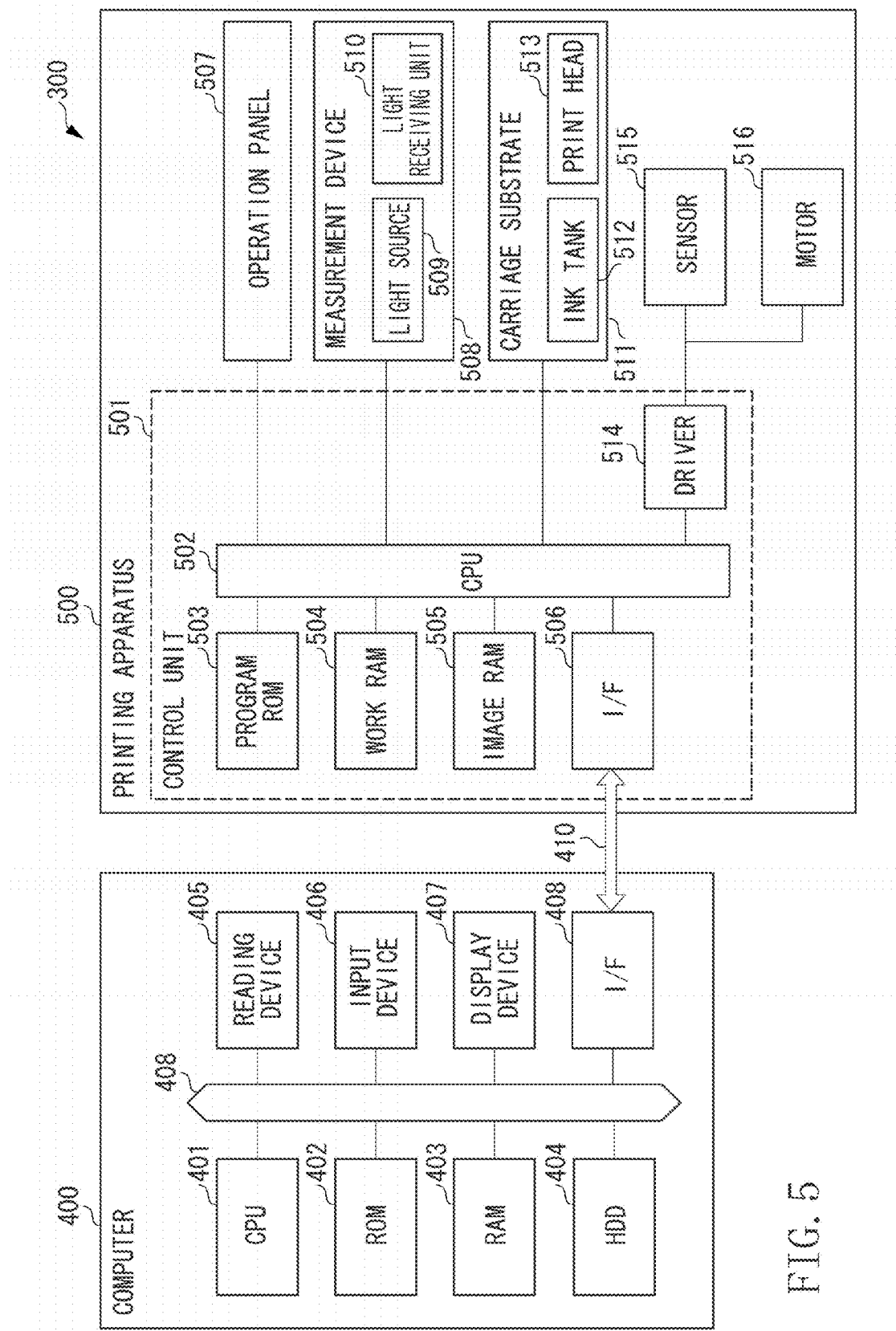
FIG. 5 is a block diagram illustrating a configuration example of an image processing apparatus according to a first exemplary embodiment.

FIG. 5 is a block diagram illustrating a configuration example of an image processing apparatus 300 according to the present exemplary embodiment. The image processing apparatus 300 according to the present exemplary embodiment consists of a computer 400 and a printing apparatus 500, and the computer 400 and the printing apparatus 500 are connected to each other via a data transmission path 410.

A central processing unit (CPU) 401 of the computer 400 serves as a system control unit for controlling various units of the computer 400 connected to one another via a bus 409, and the CPU 401 totally controls the entire computer 400.

A read only memory (ROM) 402 stores a control program of the computer 400. Based on the control program stored in the ROM 402, the CPU 401 executes various operations relating to the computer 400. In addition, the above-described control program may be stored in an external storage medium such as a compact disk read only memory (CD-ROM) instead of being stored in the ROM 402. Further, the control program may be loaded onto a random access memory (RAM) 403 of the computer 400 through a dedicated reading device, so that the CPU 401 may execute the control program by using the RAM 403 as a work memory.

A hard disk drive (HDD) 404 serves as a storage device, so that the computer 400 stores image data that is created according to an operation of a user in the HDD 404.

A reading device 405 takes image data stored in various storage media into the computer 400. For example, the reading device 405 may be a compact flash (CF) card reader, so that image data captured by a digital camera and stored in a CF card can be acquired. Alternatively, the reading device 405 may be a scanner or a CD-ROM, so that image data read by the scanner or image data stored in the CD-ROM can be acquired. Furthermore, the reading device 405 may be a network interface, so that the image data can be acquired via a network.

For example, an input device 406 may be a keyboard or a pointing device that receives an input from a user. The user can edit or process the image data taken into the computer 400 by operating the input device 406.

For example, a display device 407 may be a liquid crystal display unit, so that the image data stored in the HDD 404 or the RAM 403 can be displayed thereon.

An interface (I/F) 408 serves as an interface for connecting the computer 400 to the printing apparatus 500, and the computer 400 transmits and receives various kinds of data and various commands to and from the printing apparatus 500 via the I/F 408.

Subsequently, a configuration of the printing apparatus 500 will be described. In the present exemplary embodiment, the printing apparatus 500, which is an ink jet type, and includes an ink tank 512, will be described as an example. However, the printing apparatus 500 is not limited thereto. For example, the printing apparatus 500 may be an electro-photographic printing apparatus.

An I/F 506 of the printing apparatus 500 receives various commands transmitted from the computer 400 via the data transmission path 410.

A CPU 502 serves as a system control unit for controlling respective units of the printing apparatus 500 connected to one another, and generally controls the entire printing apparatus 500.

A program ROM 503 stores a control program of the processing executed by the printing apparatus 500 described below. Based on the control program stored in the program ROM 503, the CPU 502 executes various operations relating to the printing apparatus 500.

A work RAM 504 is a region where various kinds of information acquired through respective commands via the I/F 506 are temporarily stored as data.

An image RAM 505 is a storage region where the CPU 502 analyzes image data acquired via the I/F 506 to create print image data and rasterizes that print image data into bitmap data.

In the printing apparatus 500 according to the present exemplary embodiment, the CPU 502, the program ROM 503, the work RAM 504, the image RAM 505, the I/F 506, and a driver 514 described below function as a control unit 501 of the printing apparatus 500.

For example, an operation panel 507 may be a touch panel display unit, so that the operation panel 507 can receive an instruction with respect to the printing apparatus 500 through a touch operation by a user. In addition, the operation panel 507 can display a status of the printing apparatus 500 and an error notification.

As illustrated in FIGS. 1 and 2, a measurement device 508 includes a light source 509 and a light receiving unit 510. The measurement device 508 according to the present exemplary embodiment measures a hue of specular reflected light and a hue of diffused light of an image output to a recording medium based on the system described in Japanese Patent Application Laid-Open No. 2006-177797. Further, in the image processing apparatus 300 according to the present exemplary embodiment, the measurement device 508 is included in the printing apparatus 500. However, the configuration thereof is not limited to the above. The measurement device 508 may be mutually connected to the computer 400 and the printing apparatus 500 via respective interfaces.

A carriage substrate 511 includes ink tanks 512 and print heads 513, and executes processing for printing the print image data sequentially transmitted from the CPU 502 on a recording medium. The ink tanks 512 are respectively provided for color inks in four colors of in cyan (C), magenta (M), yellow (Y), and black (K) which include pigments as chromatic color materials. Further, in the present exemplary embodiment, in addition to the above four colors, an ink tank 512 is also provided for a clear (CL) ink which does not include a pigment as an achromatic (transparent) color material, so that five colors of inks in total are respectively stored in the five ink tanks 512. There are provided the print heads 513 respectively discharging the above inks in five colors onto the recording medium.

As described above, in the present exemplary embodiment, the ink jet printing apparatus 500 including the ink tanks 512 has been described. However, the printing apparatus 500 is not limited thereto. For example, the printing apparatus 500 may be an electro-photographic printing apparatus including a toner. In a case where the present invention is embodied in the electro-photographic printing apparatus 500, a possible exemplary embodiment is that an image is formed on a recording medium by using a color toner and a clear toner as a chromatic color material and an achromatic color material, respectively.

The driver 514, a sensor 515, and a motor 516 function as a unit for supplying a recording medium. The CPU 502 monitors the sensor 515 via the driver 514 to drive the motor 516 according to a monitoring result of the sensor 515, and executes processing for supplying the recording medium to the lower portion of the print head 513 suitable for printing processing. In synchronization with the processing for supplying the recording medium, the CPU 502 moves the print head 513 of the carriage substrate 511 to execute the printing processing.

Figure 6:
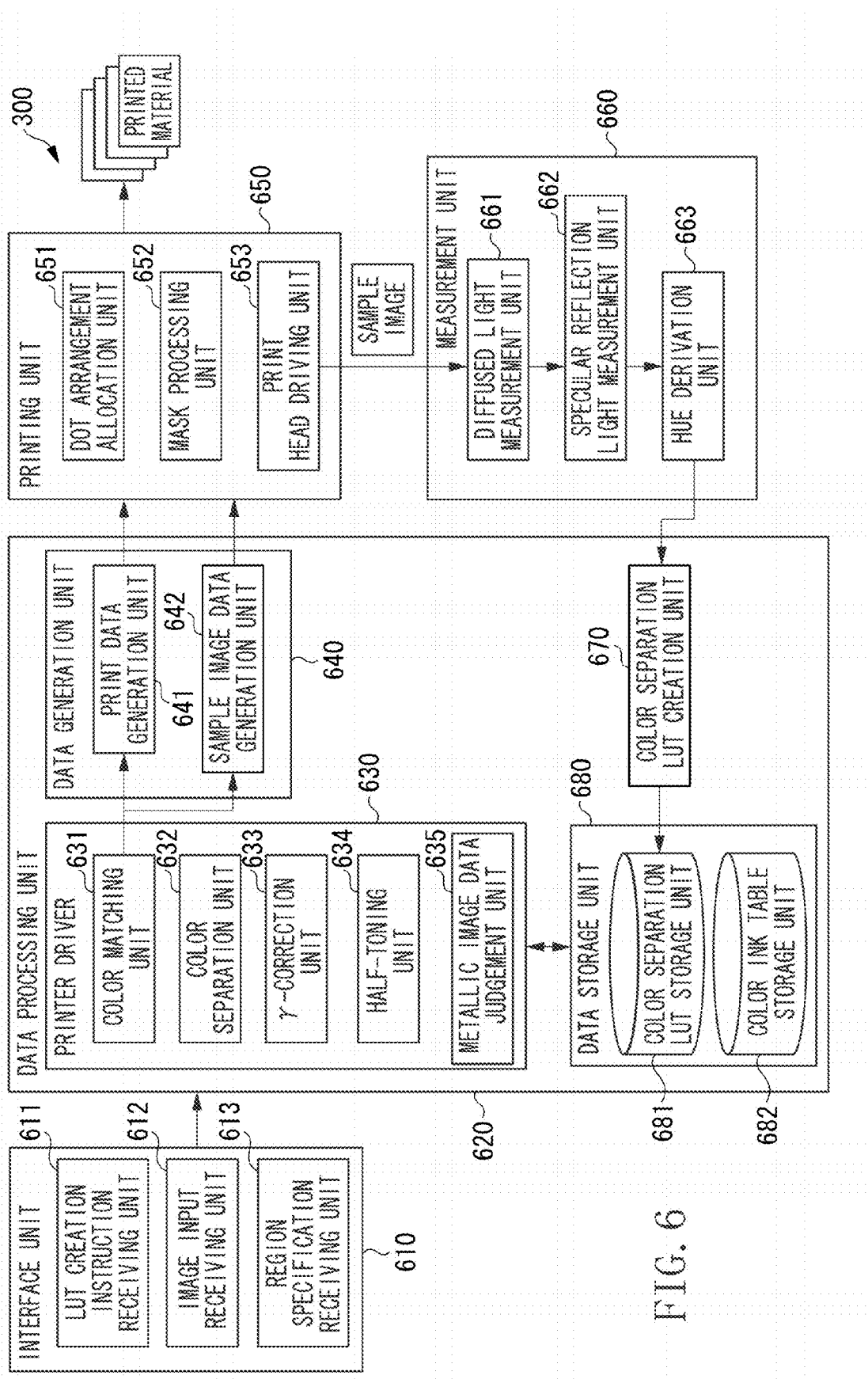
FIG. 6 is a block diagram illustrating an example of a function block of the image processing apparatus according to the first exemplary embodiment.

FIG. 6 is a function block diagram of the image processing apparatus 300 according to the present exemplary embodiment. The processing executed by the image processing apparatus 300 according to the present exemplary embodiment will be described bellow with reference to the function block diagram illustrated in FIG. 6.

Functions of the image processing apparatus 300 according to the present exemplary embodiment include an interface unit 610, a data processing unit 620, a printing unit 650, and a measurement unit 660.

The interface unit 610 includes a look-up table (LUT) creation instruction receiving unit 611, an image input receiving unit 612, and a region specification receiving unit 613.

The LUT creation instruction receiving unit 611 receives an instruction on whether to newly create a color separation LUT from a user. For example, the image input receiving unit 612 corresponds to the reading device 405, and receives an input of an image that is to be printed and output by the printing unit 650. The region specification receiving unit 613 receives specification of a region in the input image which is to be expressed by a metallic color through a user's operation executed via the input device 406, and creates metallic image data of that region by specifying a metallic image data value as "1".

The data processing unit 620 is configured of a printer driver 630, a data generation unit 640, a color separation LUT creation unit 670, and a data storage unit 680.

Further, the printer driver 630 is configured of a color matching unit 631, a color separation unit 632, a γ-correction unit 633, a half-toning unit 634, and a metallic image data judgement unit 635. Contents of various kinds of processing executed by the printer driver 630 will be described below with reference to the flowchart in FIG. 10.

The data generation unit 640 is configured of a print data generation unit 641 and a sample image data generation unit 642. The print data generation unit 641 generates print data including color separation data generated by the printer driver 630 and control information. The sample image data creation unit 642 generates sample image data by using the CMYK value and the CL value set by the below-described processing steps S801 to S806.

The printing unit 650 is configured of a dot arrangement allocation unit 651, a mask processing unit 652, and a print head driving unit 653. Contents of various kinds of processing executed by the printing unit 650 will be described below with reference to the flowchart in FIG. 10.

The measurement unit 660 is configured of a diffused light measurement unit 661, a specular reflected light measurement unit 662, and a hue derivation unit 663. The diffused light measurement unit 661 uses a system for evaluating the coloring of diffused light illustrated in FIG. 2 to measure the coloring of diffused light of a sample image. The specular reflected light measurement unit 662 uses a system for evaluating the coloring of specular reflected light illustrated in FIG. 1 to measure the coloring of specular reflected light of the sample image. The hue derivation unit 663 derives a hue of specular reflected light from the measured coloring of the specular reflected light.

Based on a measurement result of the measurement unit 660, the color separation LUT creation unit 670 determines a CL value that corresponding to an RGB value corresponding to the color information of the image data, and creates a color separation LUT in which the RGB value and the CL value are associated with each other.

For example, the data storage unit 680 corresponds to the HDD 404 of the computer 400, and the data storage unit 680 is configured of a color separation LUT storage unit 681 and a color ink table storage unit 682. The color separation LUT storage unit 681 is a region where table data of the color separation LUT illustrated in FIG. 9B is stored. The color ink table storage unit 682 is a region where table data of the color ink table illustrated in FIG. 9A is stored.

Next, processing content of the image processing apparatus 300 according to the present exemplary embodiment will be described with reference to the flowcharts and tables illustrated in FIGS. 7 to 10. Program codes stored in the ROMs 402 and 503 are loaded onto the RAMs 403 and 504, so that the CPUs 401 and 502 execute respective flows of processing illustrated in the flowcharts in FIGS. 7, 8, and 10.

Figure 7:
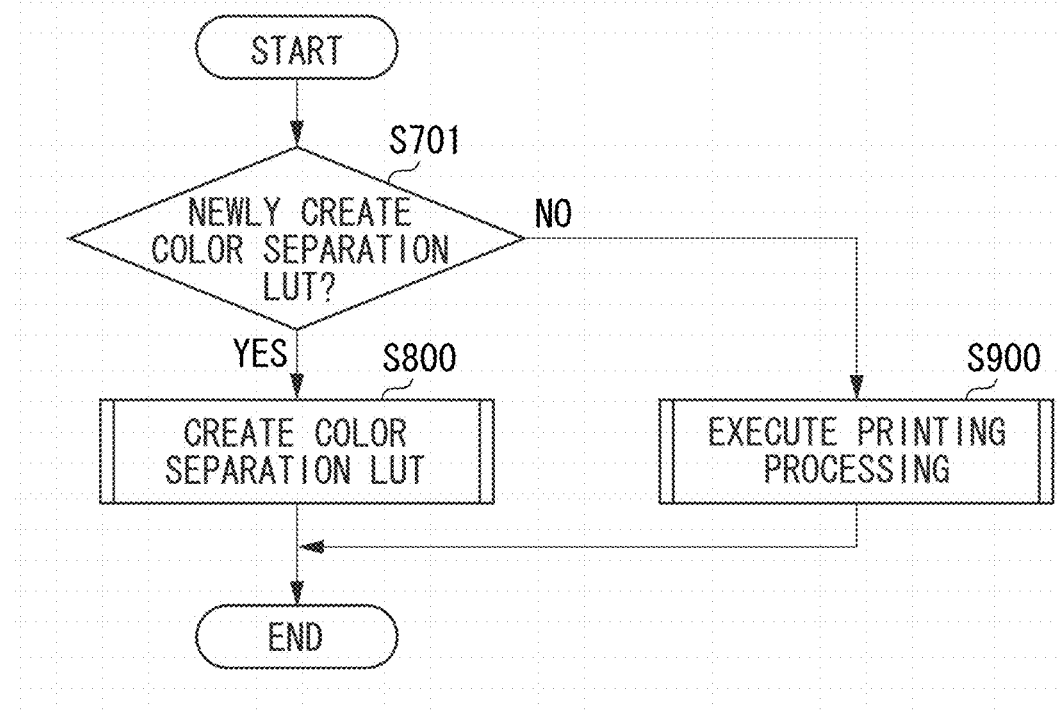
FIG. 7 is a flowchart illustrating processing of the image processing apparatus according to the first exemplary embodiment.

FIG. 7 is a flowchart illustrating processing content of main processing executed by the image processing apparatus 300 according to the present exemplary embodiment. Hereinafter, description will be given with reference to the flowchart illustrated in FIG. 7.

In step S701, the data processing unit 620 executes processing for judging whether to newly create a color separation LUT. At this time, if the LUT creation instruction receiving unit 611 has received an instruction for newly creating the color separation LUT (YES in step S701), the processing proceeds to step S800 in order to newly create the color separation LUT. On the other hand, if the LUT creation instruction receiving unit 611 has not received an instruction for newly creating the color separation LUT (NO in step S701), the processing proceeds to step S900 in order to execute normal printing processing.

<Creation of Color Separation LUT>

FIG. 8 (consisting of FIGS. 8A and 8B) is a flowchart illustrating processing content of the color separation LUT creation processing executed by the image processing apparatus 300 according to the present exemplary embodiment. Hereinafter, description will be given with reference to the flowchart illustrated in FIG. 8.

In step S801, the color separation LUT creation unit 670 refers to a color ink table and executes processing for setting an RGB value of a color separation LUT.

Now, description will be given to the content of the color ink table in FIG. 9A and the color separation LUT in FIG. 9B. The color ink table in FIG. 9A is previously stored in the data storage unit 680 of the image processing apparatus 300, and an 8-bit RGB value and an 8-bit CMYK value are stored in association with each other. The RGB value corresponds to color information of image data, whereas the CMYK value corresponds to color material amount data of the chromatic color material of the printing apparatus 500. The CMYK value according to the present exemplary embodiment corresponds to a value indicating the amount of each color ink.

The color separation LUT in FIG. 9B is created by the color separation LUT creation unit 670, and content of the color ink table in FIG. 9A and 8-bit CL values are stored in association with each other. The CL value corresponds to the color material amount data of the achromatic color material of the printing apparatus 500, and in the present exemplary embodiment, the CL value corresponds to a value representing an amount of the clear ink. Although description will be given below, the color separation unit 632 of the printer driver 630 refers to the color separation LUT to acquire a CMYK value and a CL value necessary for print data when printing processing is executed. Further, based on the hue of the sample image derived by the measurement unit 660, the color separation LUT creation unit 670 creates a color separation LUT in which a correspondence relationship between the RGB value, the CMYK value, and the CL value is stored.

As illustrated in the color separation LUT in FIG. 9B, in step S801, the color separation LUT creation unit 670 refers to the color ink table and stores the RGB value (0, 0, 0) as a first set value of the color separation LUT.

In step S802, the color separation LUT creation unit 670 refers to the color ink table and executes setting processing of the CMYK value of the color separation LUT. In the example described in the present exemplary embodiment, the color separation LUT creation unit 670 stores the CMYK value (0, 0, 0, 0) as a first set value of the color separation LUT corresponding to the RGB value set in step S801.

In step S803, the color separation LUT creation unit 670 executes setting processing of a CL value corresponding to the RGB value. In the example of the present exemplary embodiment, a value "16" is set as a first CL value corresponding to the RGB value (0, 0, 0) set in step S801.

In step S804, the color separation LUT creation unit 670 determines whether a summation of the CMYK value and the CL value exceeds a predetermined upper limit value. The upper limit value is set thereto because an amount of moisture that can be kept by a reception layer of the recording medium has a limitation, so that the amount of ink that can be applied on the recording medium is limited. If the summation of the CMYK value and the CL value exceeds the upper limit value (YES in step S804), the processing returns to step S801 so that setting processing of the RGB value for the color separation LUT is executed again.

In step S805, the color separation LUT creation unit 670 determines whether setting processing of all of the CL values corresponding to the RGB value has been completed. In the present exemplary embodiment, as illustrated in the example of FIG. 9B, if all of the corresponding CL values (such as 0, 16, 32, ..., 255) has been set with respect to the RGB value (0, 0, 0) (YES in step S805), the processing proceeds to step S806. On the other hand, if the setting processing of all of the CL values has not been completed (NO in step S805), the processing proceeds to step S803, so that the processing for setting the CL value corresponding to the next RGB value will be executed.

In step S806, the color separation LUT creation unit 670 determines whether the setting processing of all of the CL values corresponding to all of the RGB values has been completed. In the present exemplary embodiment, as illustrated in the example of FIG. 9B, if all of the CL values such as "0", "16", "32", ..., and "255" has been set with respect to all of the RGB values (0, 0, 0), (0, 0, 16), ..., and (255, 255, 255) (YES in step S806), the processing proceeds to step S807. On the other hand, if the setting processing of all of the CL values corresponding to all of the RGB values has not been completed (NO in step S806), the processing returns to step S801, so that the setting processing of the RGB value for the color separation LUT is executed again. In the present exemplary embodiment, as illustrated in the example of FIG. 9B, in step S801, the color separation LUT creation unit 670 refers to the color ink table and stores the RGB value "0, 0, 16" as a second set value for the color separation LUT.

In step S807, the sample image data generation unit 642 generates sample image data by using the CMYK values and the CL values set in steps S801 to S806.

Next, the printing unit 650 prints a sample image based on the sample image data generated in step S807. In step S808, the printing unit 650 executes processing for printing the sample image data and obtains the sample image.

Then, the measurement unit 660 measures colorings of the specular reflected light and the diffused light of the sample image printed in step S808.

In step S809, the diffused light measurement unit 661 measures the coloring of the diffused light of the sample image. The diffused light measurement unit 661 uses the system for evaluating the coloring of diffused light illustrated in FIG. 2 to measure the coloring of the diffused light of the sample image. Subsequently, the hue derivation unit 663 derives the hue of diffused light from the measured coloring of the diffused light.

In step S810, the specular reflected light measurement unit 662 measures the coloring of the specular reflected light of the sample image. The specular reflected light measurement unit 662 uses the system for evaluating the coloring of specular reflected light illustrated in FIG. 1 to measure the coloring of the specular reflected light of the sample image. Subsequently, the hue derivation unit 663 derives the hue of specular reflected light from the measured coloring of the specular reflected light.

Next, the color separation LUT creation unit 670 determines the CL value corresponding to the RGB value based on the measurement result acquired in steps S809 and S810, and creates the color separation LUT including the correspondence relationship of the RGB value and the CL value.

In step S811, the color separation LUT creation unit 670 determines the CL value corresponding to the RGB value. In the present exemplary embodiment, a difference between the hue of diffused light derived in step S809 and the hue of specular reflected light derived in step S810 is calculated, and a CL value that minimizes the difference is determined as the CL value corresponding to the RGB value. As illustrated in the color separation LUT in FIG. 9B, when the CL value "16" corresponding to the RGB value (0, 0, 0) is determined, in step S813 described below, the color separation LUT creation unit 670 stores a value "16" as the CL value corresponding to the RGB value (0, 0, 0). In addition, a state of "conformity" in the present invention is accomplished when the hue of diffused light completely conforms to the hue of specular reflected light while the respective hues have approximate values within a predetermined range.

In step S812, the color separation LUT creation unit 670 determines whether determination processing of all of the CL values corresponding to all of the RGB values has been completed. In the present exemplary embodiment, as illustrated in the example of FIG. 9B, if all of the corresponding CL values "16", "32", ..., and "0" have been determined with respect to the RGB values (0, 0, 0), (0, 0, 16), ..., and (255, 255, 255) (YES in step S812), the processing proceeds to step S813. On the other hand, if the determination processing of all of the CL values corresponding to all of the RGB values has not been completed (NO in step S812), the processing proceeds to step S811, so that the determination processing of the CL value is executed again.

In step S813, the color separation LUT creation unit 670 stores all of the CL values determined in steps S811 and S812 in association with the RGB values and the CMYK values to create the color separation LUT as illustrated in FIG. 9B.

As described above, the image processing apparatus 300 according to the present exemplary embodiment can acquire the color separation LUT which includes CL values for acquiring an image output in which a hue of diffused light conforms to a hue of specular reflected light with respect to all of the RGB values.

<Printing Processing>

FIG. 10 is a flowchart illustrating processing content of the printing processing executed by the image processing apparatus 300 according to the present exemplary embodiment. Hereinafter, description will be given with reference to the flowchart illustrated in FIG. 10.

In step S901, the image input receiving unit 612 receives an input of an image that is to be printed and output by the printing unit 650. In the present exemplary embodiment, the image input receiving unit 612 corresponds to a reading device such as a CF card reader and a CD-ROM, or a scanner for taking the image data into the computer 400.

The image received in step S901 is taken into the computer 400 as an 8-bit RGB image data, stored in the HDD 404, and transmitted to the printer driver 630. The image data taken into the computer 400 is displayed on the display device 407 thereof, so that the user can execute image editing and image processing.

In step S902, the color matching unit 631 executes color matching processing of the image data. In the present exemplary embodiment, the color matching unit 631 executes the color gamut mapping processing of the image data, and converts the 8-bit RGB image data into RGB data in the color gamut of the printing device 500 to execute the color matching processing of the image data.

In step S903, based on the RGB image data on which the color matching processing is executed in step S902, the color separation unit 632 executes color separation processing in order to reproduce the coloring of the diffused light indicated by the RGB data of a pixel as a target (hereinafter referred to as "target pixel"). More specifically, the color separation unit 632 refers to the RGB data and the color separation LUT of the target pixel, and acquires the CMYK value and the CL value for obtaining the image output in which the hue of diffused light conforms to the hue of specular reflected light (hereinafter, the CMYK value and the CL value are also referred to as "color separation data"). In the present exemplary embodiment, the CMYK value and the CL value are respectively defined with 8-bit, and values corresponding to ink amounts of respective colors of C, M, Y, K, and CL are used.

In step S904, the γ-correction unit 633 executes γ-correction processing on the respective pieces of color separation data acquired in step S903. More specifically, the γ-correction unit 633 uses the LUT that is appropriate for tone characteristics of respective color materials of the printing apparatus 500 to execute conversion that can linearly associate the color separation data with the tone characteristics of the printing apparatus 500. In addition, the γ-correction unit 633 does not execute the γ-correction processing on the CL value because the clear ink is transparent.

In step S905, the half-toning unit 634 executes half-toning processing for converting the 8-bit color separation data into 4-bit color separation data. The γ-bit color separation data obtained by the half-toning processing is used as index data (tone value information) for specifying a dot arrangement pattern in the printing apparatus 500.

In step S906, the print data generation unit 641 executes processing for generating print data including the 4-bit color separation data acquired in step S905 and the control information.

Although description has been given of the exemplary embodiment in which the half-toning processing (in step S905) and the print data generation processing (in step S906) are executed by the printer driver 630 of the computer 400, the exemplary embodiment is not limited to those. For example, the half-toning processing may be executed by the printing apparatus 500.

In step S907, the dot arrangement allocation unit 651 executes dot arrangement processing for each pixel of the image as a printing target according to the 4-bit color separation data acquired in step S905. Through the half-toning processing executed in step S905, the 8-bit color separation data is converted into the 4-bit color separation data. The dot arrangement allocation unit 651 allocates a dot arrangement to each pixel defined by the 4-bit data, so that dot allocation can be defined with respect to each of a plurality of areas within the pixel. In other words, the dot arrangement allocation unit 651 can define whether to discharge a dot to each of the areas within the pixel, and in the present exemplary embodiment, binary discharge data having a value of "1" or "0" defines whether to discharge dots to the respective areas within the pixel.

In step S908, the mask processing unit 652 executes mask processing of the discharge data acquired in step S907 and acquires mask data from the discharge data. In the present exemplary embodiment, the mask processing unit 652 executes the mask processing to discharge the clear ink at the end. By executing the mask processing in the above-described manner, the clear ink can be applied on top of the other color inks applied on the recording medium. The mask processing will be described below in detail with reference to FIGS. 11 and 12.

In step S909, based on the respective pieces of discharge data of C, M, Y, K, and CL defined in step S907, the print head driving unit 653 executes print head driving processing to drive the print head 513 at an appropriate timing. The print head 513 is driven in the print head driving processing, so that the inks in respective colors of C, M, Y, K, and CL are discharged according to the discharge data.

In the present exemplary embodiment, the dot arrangement allocation unit 651 and the mask processing unit 652 execute respective pieces of processing according to the control of the CPU 502 that configures the control unit 501 of the printing apparatus 500. The above pieces of processing may be executed by the printer driver 630 of the computer 400.

As described above, the image processing apparatus 300 according to the present exemplary embodiment refers to the RGB data and the color separation LUT of the target pixel, and acquires the CMYK value and the CL value for obtaining the image output in which the hue of diffused light conforms to the hue of specular reflected light. Then, the printing apparatus 500 outputs an image in which the hue of diffused light conforms to the hue of specular reflected light onto the recording medium based on the CMYK value and the CL value, and thus it is possible to obtain the image output in which a metallic texture such as gold or silver is reproduced favorably.

<Multi-Pass Printing System>

As described above, in step S908, the mask processing unit 652 executes processing for converting the discharge data which defines whether to discharge dots to respective areas within the pixel into the mask data. The printing apparatus 500 according to the present exemplary embodiment employs a printing method known as a multi-pass printing system in which the print head 513 is driven at an appropriate timing based on the mask data.

Generally, the ink jet printing apparatus 500 employs a multi-pass printing system in order to reduce deterioration of an output image caused by variations in discharge characteristic of ink depending on types, or variations in conveyance accuracy of recording media.

Figure 11:
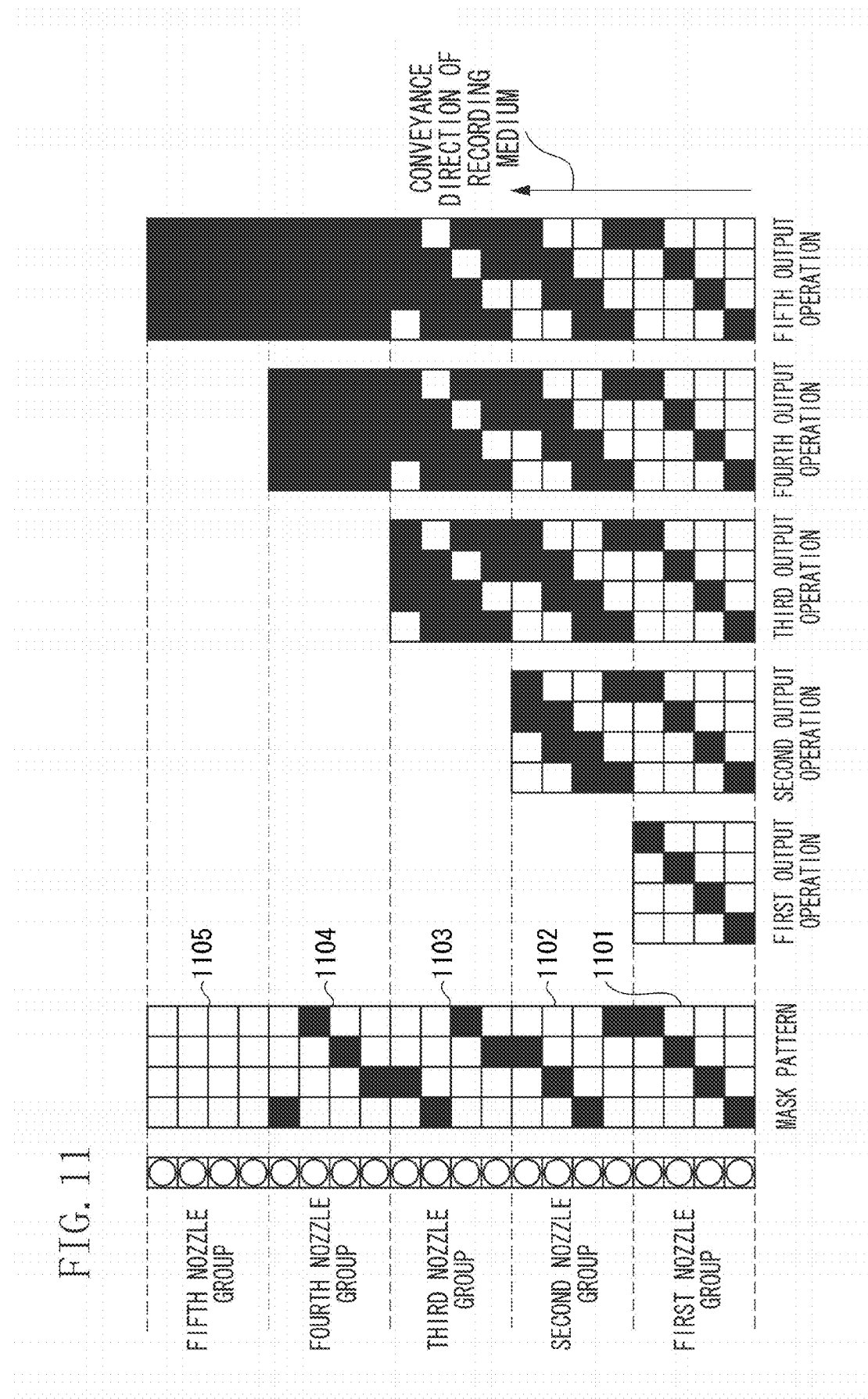
FIG. 11 illustrates a multi-pass printing system according to the first exemplary embodiment.

FIG. 11 is a diagram illustrating a multi-pass printing system according to the present exemplary embodiment. As illustrated in FIG. 11, first to fourth nozzle groups respectively correspond to the color inks of C, M, Y, and K. Although description will be given below, a fifth nozzle group corresponds to the clear ink CL. Patterns output to the recording medium by the first to the fourth nozzle groups are complemented with each other, so that printing of a pixel corresponding to a 4×4 areas is completed when all of the output patterns of the first to the fourth nozzle groups are combined with each other.

In a first output operation, the first nozzle group scans the recording medium according to a mask pattern 1101 to output ink thereon. Similarly, in a second output operation, the second nozzle group scans the recording medium according to a mask pattern 1102 to output ink thereon. Every time the scanning operation is executed by each nozzle group, the recording medium is conveyed in a direction indicated by an arrow in FIG. 11 in steps of an amount of a width of the nozzle group. Thereafter, by similarly executing third and fourth output operations, printing of the pixel corresponding to the 4×4 areas with the color inks of C, M, Y, and K is completed.

Figure 12:
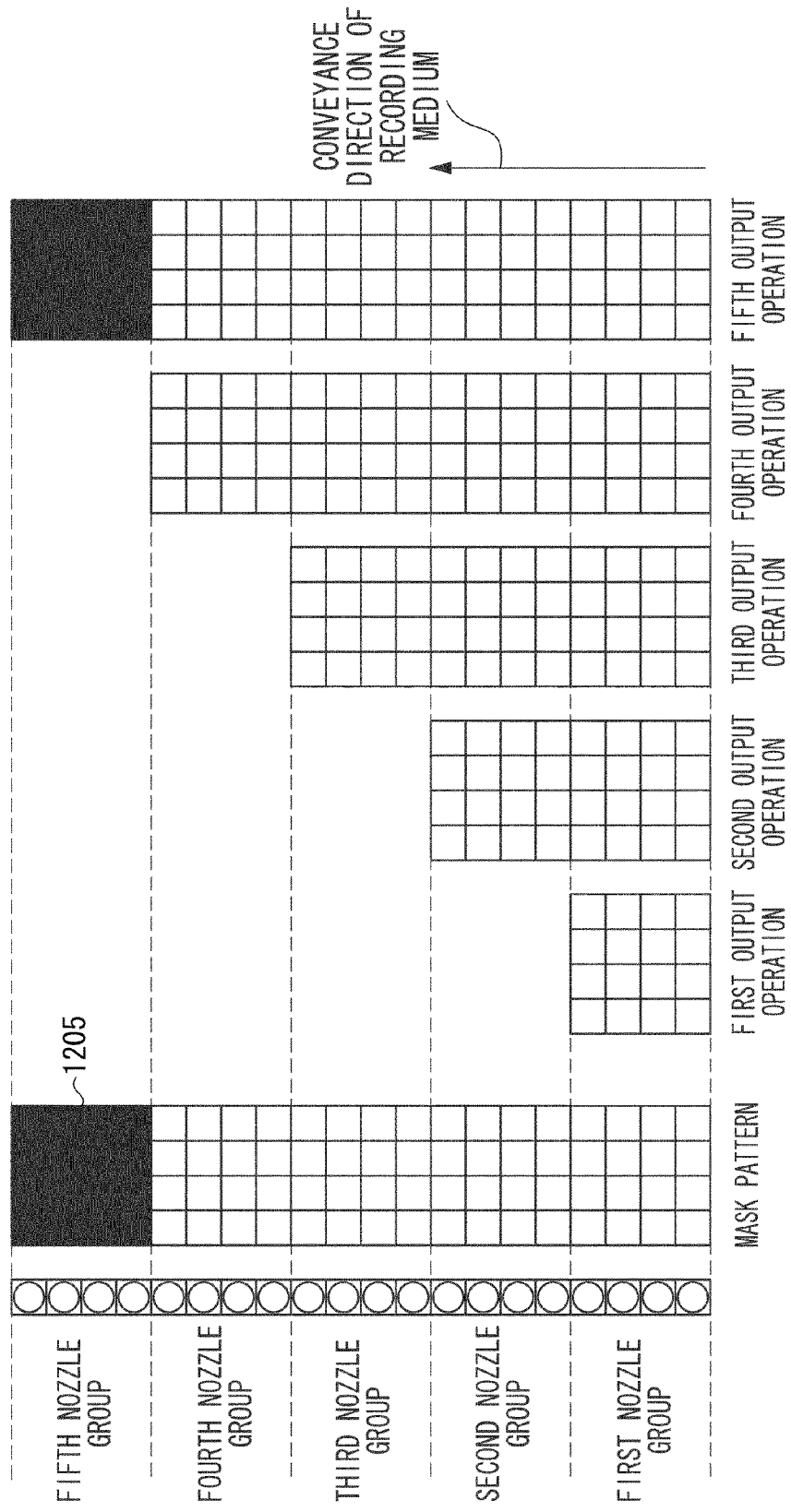
FIG. 12 illustrates a multi-pass printing system according to the first exemplary embodiment.

FIG. 12 is a diagram illustrating a multi-pass printing system according to the present exemplary embodiment. Herein, only the processing executed by the fifth nozzle group corresponding to the clear ink will be described.

As illustrated in FIG. 11, because the first to the fourth output operations are respectively executed by the first to the fourth nozzle groups, printing of the pixel corresponding to the 4×4 areas with the color inks of C, M, Y, and K is completed.

Then, as illustrated in FIG. 12, in a fifth output operation, the fifth nozzle group scans the recording medium according to a mask pattern 1205 to discharge the clear ink thereon. As described above, the printing apparatus 500 according to the present exemplary embodiment specifies a mask pattern from generated mask data, and executes mask processing so as to discharge the clear ink at the end of the processing. Through the above configuration, the clear ink can be applied on top of the other color inks applied on the recording medium.

Further, in the above-described example, the clear ink has been discharged on the recording medium through a single scanning operation executed by the fifth nozzle group. However, the mask pattern with respect to the output operation executed by the fifth nozzle group is not limited to the above. For example, a sixth nozzle group (not illustrated) may further discharge the clear ink for a plurality of times according to the mask pattern.

As described above, the image processing apparatus 300 according to the present exemplary embodiment can process the image data so as to cause the hue of diffused light and the hue of specular reflected light of the image output to the recording medium to coincide with each other. Therefore, it is possible to form an image in which a metallic texture such as gold or silver is favorably reproduced through a simple method without using a gold toner and a silver toner which are relatively hard to handle.

In the first exemplary embodiment, description has been given of the processing for obtaining an output image in which hues of diffused light and hues of specular reflected light of the entire pixels in the image received by the image input receiving unit 612 coincide with each other.

However, in general, an image expressed by the metallic color entirely is unusual, and in many cases, only a part of the image is expressed by the metallic color. Therefore, in a second exemplary embodiment, description will be given of an image processing method for specifying only a part of an image expressed by the metallic color as a target of the color separation processing for causing a hue of diffused light coincide with a hue of specular reflected light. In the present exemplary embodiment, because differences between the first and the present exemplary embodiment are mainly described, same reference numerals are assigned to the configurations common to those described in the first exemplary embodiment.

Figure 13B:
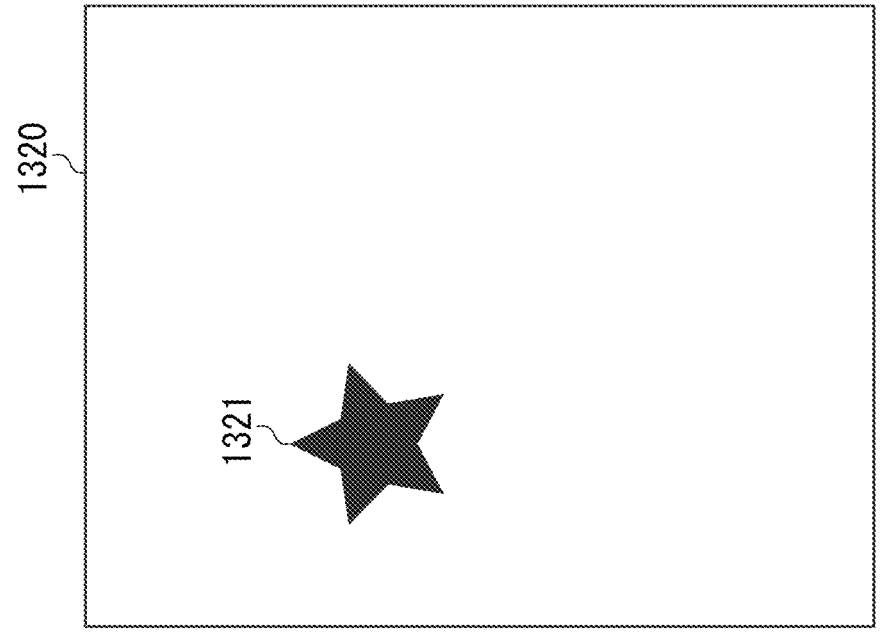
FIG. 13B illustrates an example of metallic image data.
Figure 13A:
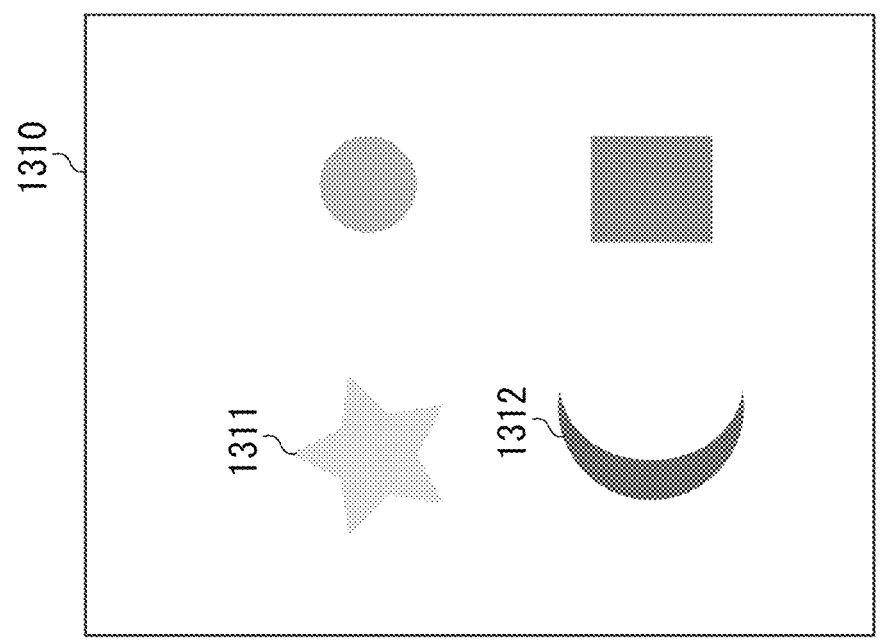
FIG. 13A illustrates an example of an image according to a second exemplary embodiment.

FIGS. 13A and 13B are diagrams illustrating examples of images serving as printing targets according to the present exemplary embodiment. An image illustrated in FIG. 13A includes a star-shape object 1311 expressed by a metallic color and a moon-shape object 1312 expressed by a non-metallic color. On the other hand, FIG. 13B is a diagram illustrating an example of a metallic image data according to the present exemplary embodiment.

The metallic image data consists of one-bit data indicating that a target pixel in the image data is expressed by a metallic color. For example, in FIG. 13B, a region 1321 is a region corresponding to the star-shape object 1311 expressed by the metallic color, so that a metallic image data value is "1". On the other hand, a region other than the region 1321 is not expressed by the metallic color, so that the metallic image data value is "0".

For example, the above-described metallic image data can be created via the interface unit 610 illustrated in FIG. 6. More specifically, with respect to an image taken into the computer 400, the region specification receiving unit 613 receives a specification of a region expressed by the metallic color, and creates metallic image data of the specified region by specifying the metallic image data value as "1".

Figure 14:
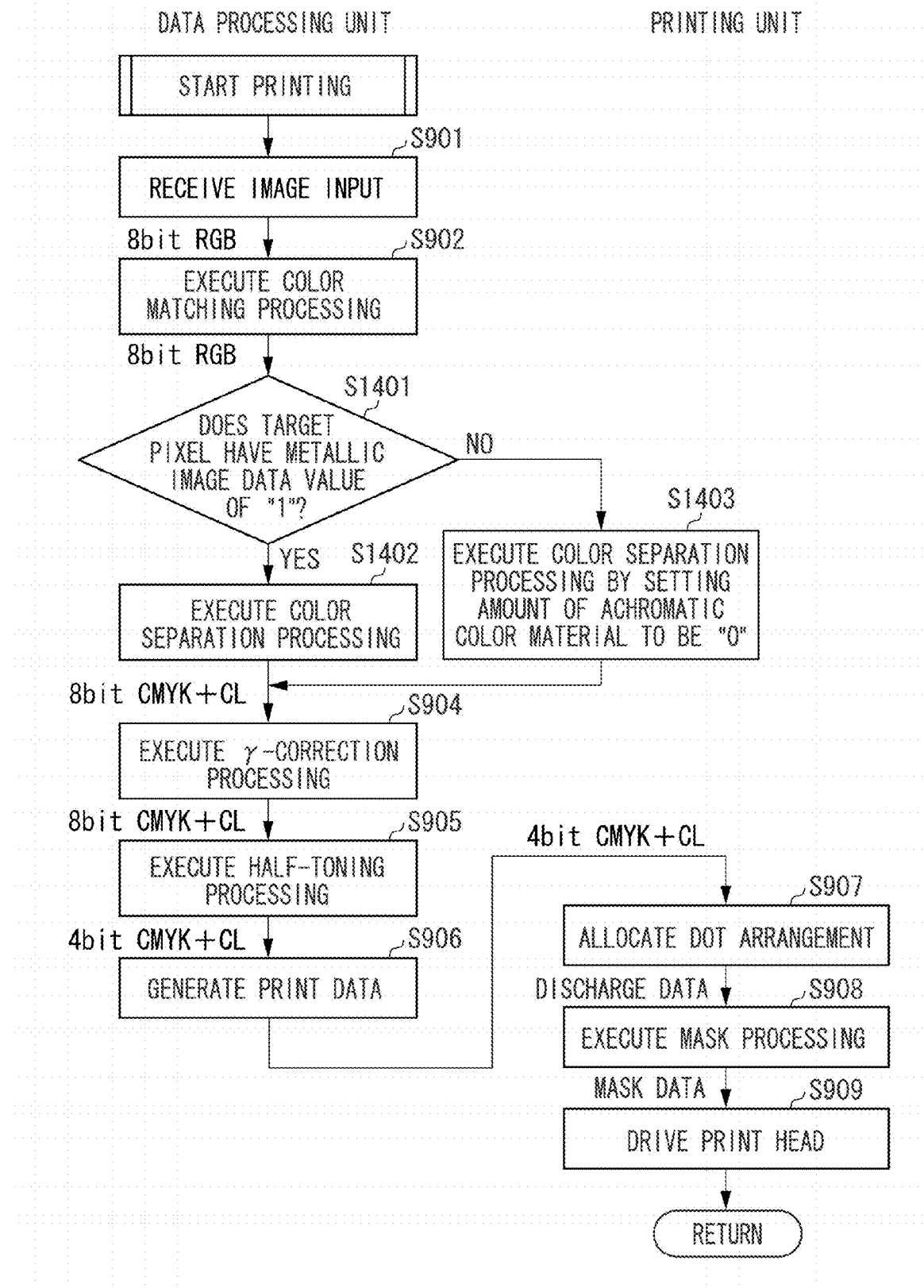
FIG. 14 is a flowchart illustrating processing of the image processing apparatus according to the second exemplary embodiment.

FIG. 14 is a flowchart illustrating processing content of the printing processing according to the present exemplary embodiment. Hereinafter, description will be given with reference to the flowchart illustrated in FIG. 14. Further, as described above, description of the configurations already described in the first exemplary embodiment will be omitted.

When the color matching processing of step S902 is completed, in step S1401, the metallic image data judgement unit 635 determines whether a target pixel within the image data regarded as a target of the color separation processing has a metallic image data value of "1". In other words, the metallic image data determination unit 635 determines whether the target pixel is expressed by the metallic color.

If it is determined that the target pixel has the metallic image data value of "1" (YES in step S1401), the processing proceeds to step S1402. In step S1402, similar to the processing executed in the first exemplary embodiment, the color separation unit 632 refers to the RGB data and the color separation LUT of the target pixel and acquires the color separation data. On the other hand, if it is determined that the target pixel has the metallic image data value of "0" (NO in step S1401), the processing proceeds to step S1403. In step S1403, the color separation unit 632 executes the color separation processing of the target pixel by setting the CL value to be "0". When the processing in step S1402 or S1403 is completed, the processing proceeds to step S904.

As described above, the printing apparatus 500 according to the present exemplary embodiment specifies only a part of the image expressed by the metallic color as a target of the color separation processing for causing a hue of diffused light and a hue of specular reflected light to coincide with each other, from among the image regarded as a target of the output processing. Through the above-described operations, even in a case where only a part of the image is expressed by the metallic color, the image data can be processed by specifying that part of the image as a processing target for causing a hue of diffused light and a hue of specular reflected light to coincide with each other. As a result, it is possible to form an image in which a metallic texture is favorably reproduced on only a part of the image.

<Another Exemplary Embodiment>

Further, the present invention can be realized by executing the following processing. Specifically, software (program) for realizing the function of the above-described exemplary embodiment is supplied to a system or an apparatus via a network or various storage media, so that a computer (or a CPU or a micro processing unit (MPU)) of the system or the apparatus reads and executes the program.

Further, a program code for realizing the function of the present exemplary embodiment may be executed by a single computer (i.e., a CPU or an MPU), or may be cooperatively executed by a plurality of computers. Furthermore, the program code may be executed by a computer, and hardware such as a circuit for realizing the function of the program code may be provided. In addition, a part of the program code may be realized by the hardware whereas the rest of the program code may be executed by the computer.

It is possible to provide an image processing apparatus and an image processing method capable of favorably reproducing a metallic texture on a recording medium through a simple method without using a gold toner and a silver toner which are relatively difficult to handle.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-192889, filed Sep. 22, 2014, which is hereby incorporated by reference herein in its entirety.

What is claimed is:

1. An image processing apparatus comprising:
   an input unit configured to receive color information included in image data;
   a conversion unit configured to convert the color information into color material amount data of a chromatic color material; and
   a determination unit configured to make a determination on color material amount data of an achromatic color material to be formed on top of the chromatic color material on a recording medium so as to cause a hue of diffused light and a hue of specular reflected light of an image, which is formed of a chromatic color material corresponding to the converted color material amount data of the chromatic color material, formed on the recording medium to coincide with each other.

2. The image processing apparatus according to claim 1, wherein the image data includes region information that specifies a region of an image expressed by the image data.

3. The image processing apparatus according to claim 1, further comprising a receiving unit configured to receive specification of a region of an image expressed by image data, wherein, with respect to the region where the receiving unit receives the specification thereof, the determination unit determines the color material amount data of the achromatic color material.

4. The image processing apparatus according to claim 1, further comprising a judgement unit configured to judge whether a target pixel within image data is expressed by a metallic color,
   wherein, with respect to the target pixel judged to be expressed by the metallic color, the determination unit determines the color material amount data of the achromatic color material.

5. The image processing apparatus according to claim 1, further comprising:
   a sample image data generation unit configured to generate sample image data by using the color material amount data of the chromatic color material and the color material amount data of the achromatic color material;
   a printing unit configured to print a sample image of the sample image data generated by the sample image data generation unit; and
   a measurement unit configured to measure the sample image printed by the printing unit,
   wherein the measurement unit measures the sample image to derive the hue of diffused light and the hue of specular reflected light.

6. The image processing apparatus according to claim 1, further comprising a table creation unit configured to create a table in which color material amount data of the achromatic color material that minimizes a difference between the hue of diffused light and the hue of specular reflected light is associated with the color information.

7. The image processing apparatus according to claim 6, wherein the determination unit makes the determination by referring to the table in which the color material amount data of the achromatic color material that minimizes a difference between the hue of diffused light and the hue of specular reflected light is associated with the color information.

8. The image processing apparatus according to claim 1, wherein the chromatic color material and the achromatic color material are a color toner and a clear toner, respectively.

9. The image processing apparatus according to claim 1, wherein the chromatic color material and the achromatic color material are a color ink and a clear ink, respectively.

10. An image processing apparatus comprising:
    a first printing unit configured to form an image on a recording medium by using a chromatic color material; and
    a second printing unit configured to form an achromatic color material, which causes a hue of diffused light and a hue of specular reflected light to coincide with each other, on top of the formed chromatic color material, in a case where the achromatic color material is formed on top of the formed chromatic color material.

11. An image processing method comprising:
    receiving color information included in image data;
    converting the color information into color material amount data of a chromatic color material; and
    determining color material amount data of an achromatic color material to be formed on top of the chromatic color material on a recording medium so as to cause a hue of diffused light and a hue of specular reflected light of an image formed of a chromatic color material corresponding to the converted color material amount data of the chromatic color material on the recording medium to coincide with each other.

12. A non-transitory computer readable storage medium storing a program for causing a computer to execute an image processing method, the image processing method comprising:
receiving color information included in image data;
converting the color information into color material amount data of a chromatic color material; and
determining color material amount data of an achromatic color material to be formed on top of the chromatic color material on a recording medium so as to cause a hue of diffused light and a hue of specular reflected light of an image formed of a chromatic color material corresponding to the converted color material amount data of the chromatic color material on the recording medium to coincide with each other.

* * * * *